UNITED STATES PATENT OFFICE.

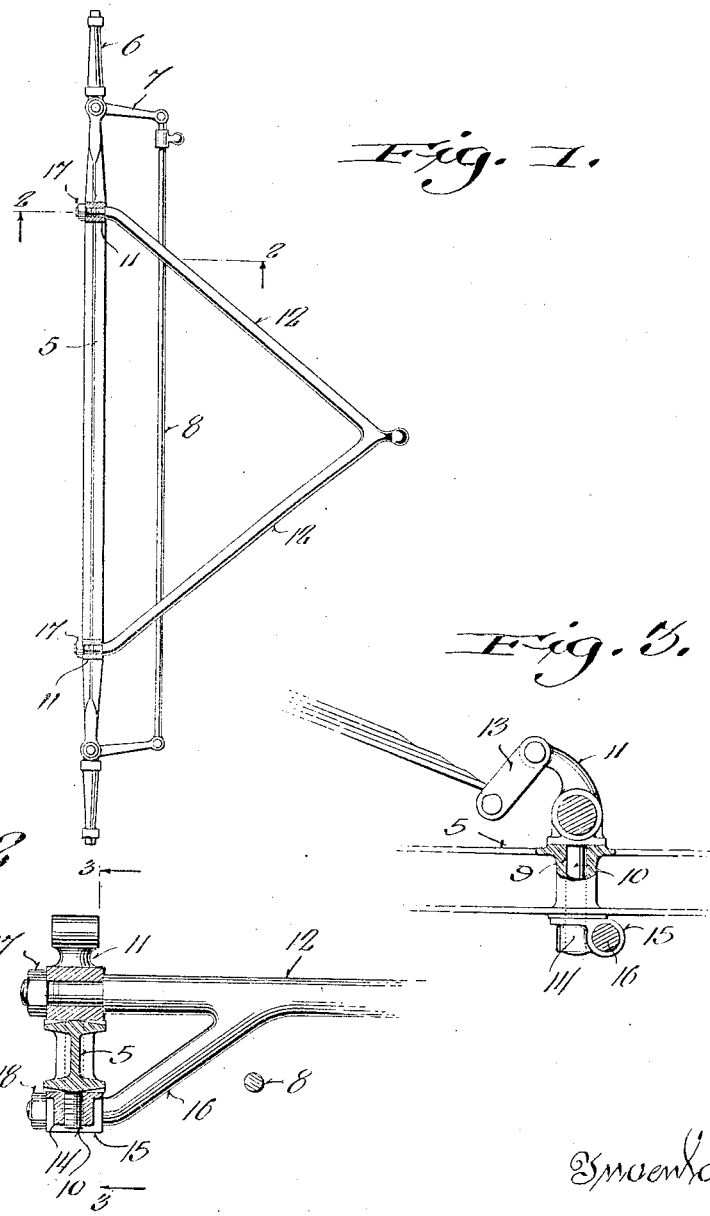

THOMAS H. JACOB, OF WAUSAU, WISCONSIN.

FRONT-AXLE RADIUS-ROD STRUCTURE.

1,347,286.   Specification of Letters Patent.   Patented July 20, 1920.

Application filed July 26, 1919. Serial No. 313,575.

*To all whom it may concern:*

Be it known that I, THOMAS H. JACOB, a citizen of the United States, and resident of Wausau, in the county of Marathon and State of Wisconsin, have invented certain new and useful Improvements in Front-Axle Radius-Rod Structures; and I do hereby declare that the following is a full, clear, and exact description thereof.

My invention relates to new and useful improvements in radius rod structures for the axles of automobiles or like vehicles, and more particularly for the front axle of an automobile of the Ford type.

It is the object of my invention to increase the rigidity afforded to a spring-connected vehicle axle by the usual divergent radius rods connected therewith.

The provision of supplemental radius rods secured to the lower portion of the axle and extending to or adjacent the point of connection of the main radius rods has heretofore been contemplated, but this arrangement defeats one of the general objects of design of this type of vehicle structure inasmuch as the major stresses of the ordinary radius rods are purposely made of such strength as to perform their functions under normal running conditions, and to yield and bend in the event of collision or other highly abnormal stress upon the front wheel structure whereby to relieve the engine base with which they are connected from transmission of such abnormal stress, the radius rod structure being of course more readily replaceable.

It is therefore more particularly my object to increase the rigidity of the front axle under normal conditions without adding reinforcement between the front axle and engine base in such manner as to interfere with this emergency yielding action, and to increase the rigidity with the addition of a minimum amount of structure. Briefly my invention resides in the compassing of the foregoing objects by providing a two-point connection of the forward end portion of each radius rod with the axle whereby to relieve twisting strain on the extremity of the radius rod, without affecting the designed strength of the major stretches of the radius rods.

A more detailed object resides in the provision of an arrangement whereby my invention may be most readily embodied in existing vehicles with a minimum modification of their structures.

With the above and other objects and advantages in view, which will be apparent as the description proceeds, my invention resides in the novel features of construction, combination and arrangement of parts which will be hereinafter more particularly described and defined by the appended claim.

In the accompanying drawings:

Figure 1 is a plan view of the front axle and radius rod structure of an automobile of the Ford type.

Fig. 2 is a sectional view through one of the radius rod connections embodying my invention.

Fig. 3 is a detail sectional view on the line 3—3 of Fig. 2.

Referring now more particularly to the accompanying drawings, 5 designates the front axle of an automobile of the Ford type, having usual spindles 6 at its ends from which extend arms 7 connected by a steering rod 8. The end portions of the axle are provided with vertical passages 9 for the reception of the bolts 10 of the usual perch studs or sleeves 11 which receive the forward extremities of the usual radius rods 12, each stud 11 also carrying the usual spring shackle 13. The radius rods are joined at their rear ends in the usual ball head for connection with the engine base (not shown). In embodying my invention with this structure, a nut 14 carrying a sleeve 15 is threaded on the lower end of each perch stud bolt 10 in lieu of the usual stock nut employed for this purpose, and this sleeve receives the horizontally turned forward end portion of a rod section 16 which is inclined upwardly and rearwardly from the sleeve at an angle of approximately thirty degrees with respect to the corresponding main radius rod, the rear end of this rod section being secured to the radius rod in an integral manner in the present instance, although other means of securement may be employed which does not affect the strength of the radius rod. It is noted that this rod section 16 is disposed forwardly of the steering rod 8 and provides ample clearance therefor in its steering movements. The usual nuts 17 are threaded on the forward ends of the radius rods, and nuts 18 are threaded on the forward ends of the lower rod sections 17, said nuts coöperating with the usual shoulders at the rear of the securing sleeves to effect a rigid securement.

I thus provide a structure where, in effect, the forward end portions of the radius rods are branched to each procure a two-point connection with the front axle and thus prevent twisting stress on the forward portions of the radius rods, although it is noted that the upper branches are continued with the same axis and diameter as the major stretches of the radius rods, except of course at their points of direct connection with the axle, so as not to interfere with the major endwise application of stresses to the main radius rod portions.

The nuts 14 are obviously locked on the bolts 10 by the lower rod sections 16, and the bolts 17 and 18 being disposed vertically do not tend to loosen with use, thus maintaining a rigid structure which is entirely free from looseness of parts and which consequently will not cause noise upon travel of the vehicle.

An exceedingly simple structure has thus been provided which will effect rigidity of the front axle under normal conditions of use without however altering the designed strength of the radius rod structure against yielding upon collision, and which involves a minimum expenditure of material over the conventional radius rod structure.

While I have shown and described a preferred embodiment of my invention, it will be appreciated that various changes and modifications of structure may be employed to meet differing conditions of use and manufacture without departing in any manner from the spirit of my invention.

What is claimed is:

In a vehicle of the class described, the combination with an axle, bolts passed through the axle, sleeves carried by the upper ends of said bolts, and radius rods having their ends secured in said sleeves, nuts threaded on the lower ends of said bolts, sleeves carried by said nuts, and rod sections having their outer ends secured in said last named sleeves and having their inner portions inclined toward and secured to the portions of the radius rods adjacent and inwardly of the axle.

In testimony that I claim the foregoing I have hereunto set my hand at Wausau, in the county of Marathon and State of Wisconsin.

THOMAS H. JACOB.